(12) United States Patent
Axelrod

(10) Patent No.: US 9,060,528 B2
(45) Date of Patent: Jun. 23, 2015

(54) 3-D CONTINUOUS SHAPING OF EDIBLE-BASED EXTRUDATES

(71) Applicant: T.F.H. Publications, Inc., Neptune City, NJ (US)

(72) Inventor: Glen S. Axelrod, Colts Neck, NJ (US)

(73) Assignee: T.F.H. PUBLICATIONS, INC., Neptune City, NJ (US)

( * ) Notice: Subject to any disclaimer, the term of this patent is extended or adjusted under 35 U.S.C. 154(b) by 0 days.

(21) Appl. No.: 13/897,894

(22) Filed: May 20, 2013

(65) Prior Publication Data

US 2013/0251872 A1    Sep. 26, 2013

Related U.S. Application Data

(62) Division of application No. 12/573,614, filed on Oct. 5, 2009, now abandoned.

(51) Int. Cl.
*A23P 1/12* (2006.01)
*A23K 1/00* (2006.01)
(Continued)

(52) U.S. Cl.
CPC ............... *A23K 1/003* (2013.01); *A01K 15/026* (2013.01); *A23K 1/1846* (2013.01); *A23P 1/105* (2013.01); *A23P 1/12* (2013.01); *B29C 47/004* (2013.01); *B29C 47/0066* (2013.01); *B29C 47/786* (2013.01); *B29C 47/802* (2013.01); *B29C 43/04* (2013.01); *B29C 43/085* (2013.01); *B29C 2043/465* (2013.01); *B29C 43/48* (2013.01); *B29C 2043/3676* (2013.01); *B29C 43/3697* (2013.01); *B29C 43/40* (2013.01); *A23K 1/1853* (2013.01); *B29C 43/222* (2013.01); *B29C 47/0023* (2013.01); *B29C 47/0866* (2013.01); *B29C 47/124* (2013.01); *B29C 47/126* (2013.01); *B29C 47/32* (2013.01); *B29C 47/56* (2013.01); *B29C 2947/92209* (2013.01); *B29C 2947/92228* (2013.01); *B29C 2947/9238* (2013.01); *B29C 2947/924* (2013.01); *B29C 2947/92704* (2013.01); *B29C 2947/92723* (2013.01);
(Continued)

(58) Field of Classification Search
CPC ... A01K 15/025; A01K 15/026; A23K 1/003; A23K 1/1846; A23P 1/105; A23P 1/12; B29C 43/04; B29C 43/06–43/085; B29C 2043/465; B29C 43/48–2043/486; B29C 2043/3676–2043/3697; B29C 43/40; B29C 47/004; B29C 47/0066; B29C 47/789
USPC .......... 426/512, 516, 520, 805; 425/374, 453, 425/392, 394–397
See application file for complete search history.

(56) References Cited

U.S. PATENT DOCUMENTS 2,595,865 A * 5/1952 Lunsford ...................... 425/237
3,303,796 A * 2/1967 Novissimo .................... 426/5
(Continued)

*Primary Examiner* — Drew Becker
(74) *Attorney, Agent, or Firm* — Grossman, Tucker, Perreault & Pfleger, PLLC

(57) ABSTRACT

A chew toy of non-uniform shape may be manufactured from an edible starch composition by introducing said composition to an extruder having a barrel and subjecting the composition to shear and heat to form a melt, and conveying the melt through an adjustable orifice while varying the cross-section dimensions of the orifice to form an extrudate having thickness dimensions that varies along its length. This may be followed by cutting the extrudate to length. The extrudate may also be passed between cooperating cavities and formed to shape. The extrudate may also be guided into predetermined patterns by repositioning the die relative to a molding surface.

7 Claims, 15 Drawing Sheets

(51) Int. Cl.
*A01K 11/00* (2006.01)
*A23K 1/18* (2006.01)
*A23P 1/10* (2006.01)
*B29C 47/00* (2006.01)
*B29C 47/78* (2006.01)
*B29C 47/80* (2006.01)
*B29C 43/04* (2006.01)
*B29C 43/08* (2006.01)
*B29C 43/48* (2006.01)
*B29C 43/40* (2006.01)
*B29C 43/22* (2006.01)
*B29C 47/08* (2006.01)
*B29C 47/12* (2006.01)
*B29C 47/56* (2006.01)
*B29C 47/38* (2006.01)
*B29C 47/60* (2006.01)
*B29C 43/46* (2006.01)
*B29C 43/36* (2006.01)
*B29C 47/32* (2006.01)
*B29L 16/00* (2006.01)

(52) U.S. Cl.
CPC ......... *B29L2016/00* (2013.01); *B29C 47/0061* (2013.01); *B29C 47/0069* (2013.01); *B29C 47/385* (2013.01); *B29C 47/6018* (2013.01)

(56) References Cited

U.S. PATENT DOCUMENTS

| | | | | |
|---|---|---|---|---|
| 4,398,881 | A * | 8/1983 | Kobayashi | 425/235 |
| 5,132,127 | A * | 7/1992 | Wisdom | 426/549 |
| 5,208,059 | A * | 5/1993 | Dubowik et al. | 426/512 |
| 5,358,727 | A * | 10/1994 | Yates et al. | 426/512 |
| 5,647,302 | A * | 7/1997 | Shipp | 119/709 |
| 6,132,199 | A * | 10/2000 | Chierici et al. | 425/233 |
| 6,217,309 | B1 * | 4/2001 | Jens et al. | 425/235 |
| 6,455,083 | B1 * | 9/2002 | Wang | 426/104 |
| 6,990,927 | B2 * | 1/2006 | Axelrod | 119/707 |
| 2008/0248180 | A1 * | 10/2008 | Barnett et al. | 426/559 |
| 2009/0078214 | A1 * | 3/2009 | Mann | 119/709 |
| 2011/0217422 | A1 * | 9/2011 | Suttle et al. | 426/89 |

* cited by examiner

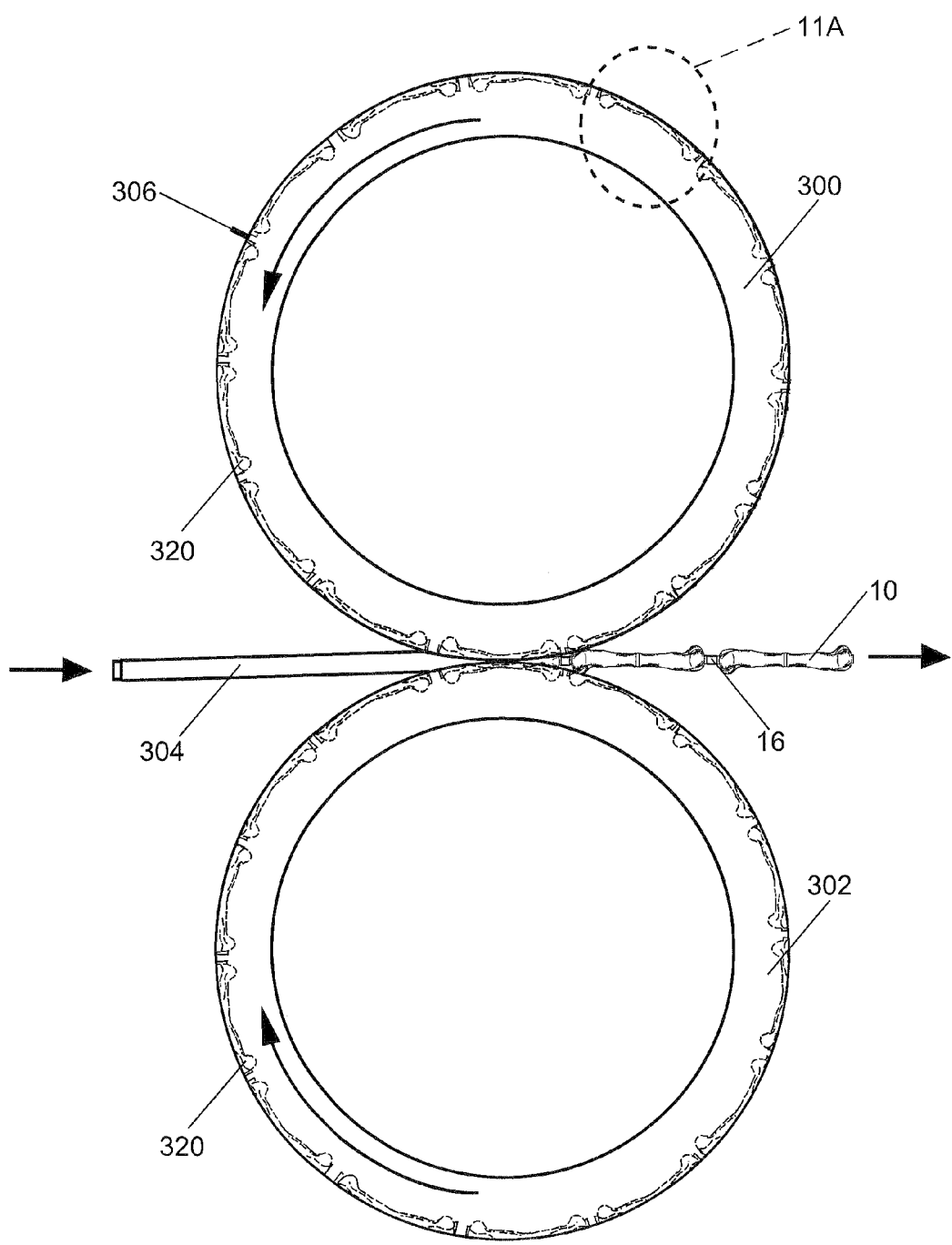

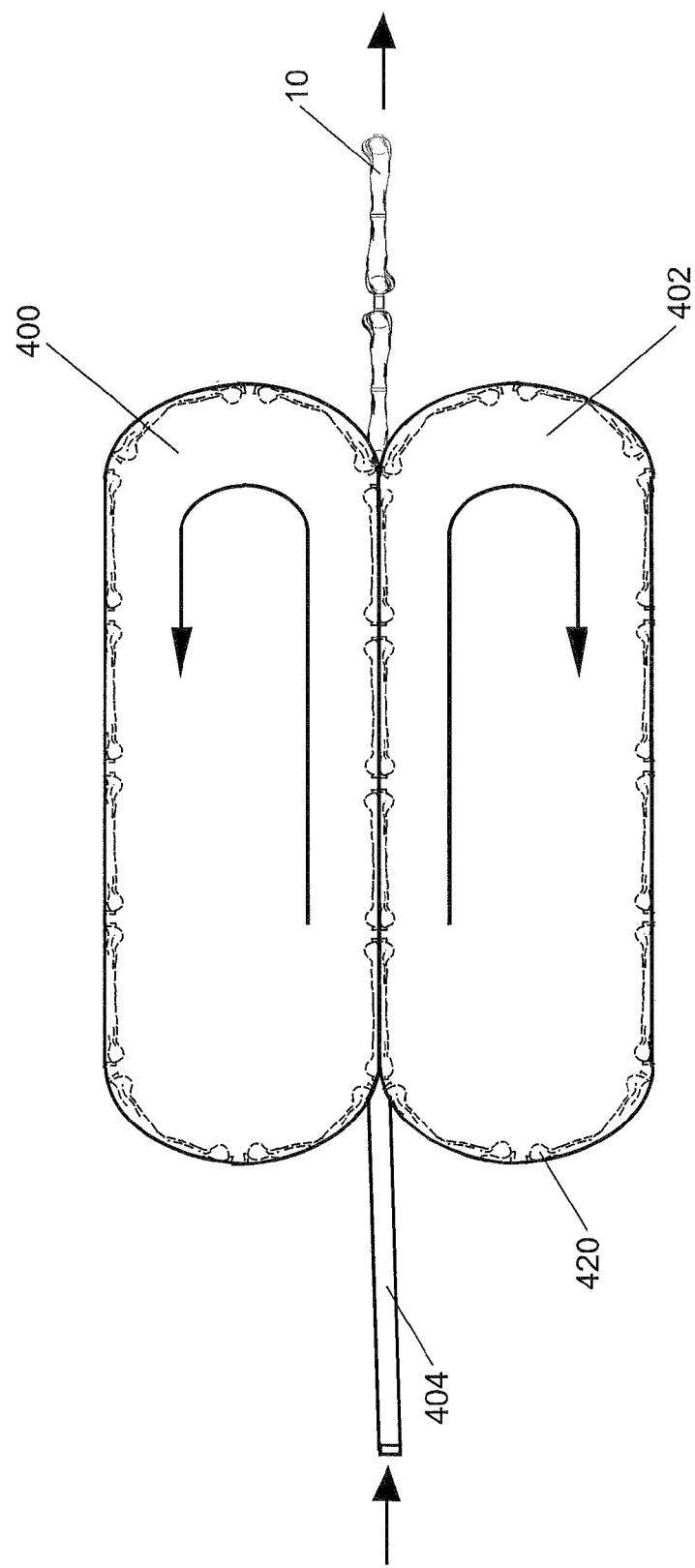

3-D CONTINUOUS SHAPING OF EDIBLE-BASED EXTRUDATES

CROSS-REFERENCE TO RELATED APPLICATIONS

This application is a divisional application of U.S. application Ser. No. 12/573,614 filed on Oct. 5, 2009 which is fully incorporated herein by reference. This application was abandoned on Sep. 6, 2013.

FIELD OF THE INVENTION

This invention relates to a method of extruding edible compositions with utility in the form of three dimensional edible products for an animal or as a chew toy for a pet. The manufacturing method disclosed herein employs melt mixing of an edible resin with selected amounts of additives, including water and other fillers, followed by extrusion wherein during or directly following extrusion the extrudate may be formed into a selected three dimensional shape which may be non-uniform. The processing conditions, including barrel temperatures and cooling profiles may be adjusted along with the relative amounts of additives and water present to provide the ability to produce extruded shapes that may obviate the need for more traditional forming procedures, such as injection molding.

BACKGROUND

The prior art does provide various disclosures directed at converting various resins such as starch or related materials into an injection molded or shaped article. For example, there are disclosures pertaining to the development of edible animal chews that are digestible and/or nutritious along with a texture that can be individually adjusted to suit a wide variety of a dog's preferences or needs. Attention is therefore directed to the following exemplary disclosures: U.S. Pat. No. 6,180,161 "Heat Modifiable Edible Dog Chew"; U.S. Pat. No. 6,159,516 "Method of Molding Edible Starch"; U.S. Pat. No. 6,126,978 "Edible Dog Chew"; U.S. Pat. No. 6,110,521 "Wheat and Casein Dog Chew with Modifiable Texture"; U.S. Pat. No. 6,093,441 "Heat Modifiable Peanut Dog Chew"; U.S. Pat. No. 6,093,427 "Vegetable Based Dog Chew"; U.S. Pat. No. 6,086,940 "High Starch Content Dog Chew"; U.S. Pat. No. 6,067,941 "Animal Chew"; U.S. Pat. No. 6,056,991 "Turkey and Rice Dog Chew With Modifiable Texture"; U.S. Pat. No. 5,941,197 "Carrot Based Dog Chew"; U.S. Pat. No. 5,827,565 "Process for Making an Edible Dog Chew"; U.S. Pat. No. 5,339,771 "Animal Chew Toy Containing Animal Meal"; U.S. Pat. No. 5,240,720 "Dog Chew with Modifiable Texture"; U.S. Pat. No. 5,200,212 "Dog Chew with Modifiable Texture." Attention is also directed to U.S. Pat. No. 6,165,474 entitled "Application for Patent for Nutriceutical Toy", U.S. Pat. No. 5,419,283 entitled "Animal Chew Toy of Starch Material and Degradable Ethylene Copolymer", U.S. Application Publication No. 2004/0009268 entitled "Blends Of Starch And Aliphatic-Aromatic Based Polyester Resins" and U.S. Application Publication No. 2007/0031555 entitled "Direct Starch Molding".

A variety of efforts have been considered to convert starch, with minimum degradation, into an injection molded product of a desired configuration. Such efforts have focused on the use of propylene glycol, fatty acid esters, alkali salts of protein material and/or water as a starch additive, followed by melt processing techniques such as extrusion and/or injection molding. The cited art generally is directed at extruding a product having uniform dimensions and injection molding that extruded composition to form more complex three dimensional shapes. A need exists for shaped articles that can be produced by extrusion alone and not incur the expense of matched tooling or the associated relatively slower injection molding process.

Accordingly, the present invention is directed at formulating edible compositions for an animal, along with selected processing/molding profiles, which formulations and processing/molding profiles allow for the continuous formation of an edible-based animal chew toy of a desired shape. In addition, it is also an object of this invention to provide a number of processing devices or protocols which may be used in a continuous extrusion process to produce a non-uniform, three dimensional shape product for consumption by an animal.

SUMMARY

In a first exemplary embodiment, the present disclosure relates to a method for forming chew toys of selected shape from an edible composition by extrusion, comprising the steps of providing an extruder including a barrel and a die having an adjustable orifice capable of providing a variety of cross-sectional dimensions and providing an extrudable composition comprising edible resin and water. This may then be followed by introducing the composition to the barrel and subjecting the composition to shear and heat to form a melt and conveying the melt through said orifice while varying the cross-section dimensions of the orifice to form an extrudate having thickness dimensions that vary along its length. The water content of the composition is sufficient to provide that the composition can be varied in cross-section when conveyed through the orifice with variations in the orifice cross-sectional dimension.

In another exemplary embodiment, the present disclosure relates to method for forming chew toys of selected shape from edible compositions by extrusion, comprising the steps of providing a first extruder, a second extruder and a third extruder, wherein the first extruder includes a first profile die, the second extruder includes a second profile die and the third extruder includes a third profile die. This may then be followed by providing a first edible composition to the first extruder and a second composition to the second extruder and a third composition to the third extruder and processing the first and second compositions through the first and second extruders including through the first and second profile dies to form first and second extrudates. Such extrudates may then be joined to one another in a shaping die, the shaping die having an opening substantially the same shape as the combined shapes of the first and second profile dies. This may then be followed by processing the third composition through the third extruder including through the third profile die to form a third extrudate and intermittently joining the third extrudate with the combined first and second extrudates in a second shaping die, the second shaping die having an opening substantially the same shape as the combined shapes of the first and second and third profile dies.

In a still further embodiment, the present disclosure relates to a method for forming chew toys of selected shape from edible compositions by extrusion, comprising the steps of providing an extruder including a barrel and a die and providing an extrudable composition comprising edible resin and water. The composition may then be introduced the barrel along with subjecting the composition to shear and heat to form a melt and conveying said melt through said die to form an extrudate and passing the extrudate between cooperating mold cavities having complementary shapes which form the shape of the chew toy while said extrudate is at a temperature and moisture level which allows the extrudate to form within said cooperating mold cavities. This may then be followed by forming the extrudate into the shape of a chew toy.

In another exemplary embodiment, the present disclosure is directed at a method for forming chew toys of selected shape from edible compositions by extrusion, comprising the steps of providing an extruder including a barrel and a die and providing an extrudable composition comprising edible resin and water. This may be followed by introducing the composition to the barrel and subjecting the composition to shear and heat to form a melt and conveying the melt through the die to form an extrudate. One may then provide a surface to receive the extrudate and guide the die over the surface in a predetermined pattern to position the extrudate on the surface in the predetermined pattern.

BRIEF DESCRIPTION OF THE DRAWINGS

Features and advantages of the present disclosure are set forth herein by description of embodiments consistent with the present disclosure, which description should be considered in conjunction with the accompanying drawings, wherein:

FIG. 11 is a side view of an apparatus for forming an extrudate into three dimensional dog chews using interacting wheels equipped with cooperating mold cavities.

FIG. 12 is a side view of an apparatus for forming an extrudate into three dimensional dog chews using interacting belts equipped with cooperating mold cavities.

DETAILED DESCRIPTION

Figure 1:
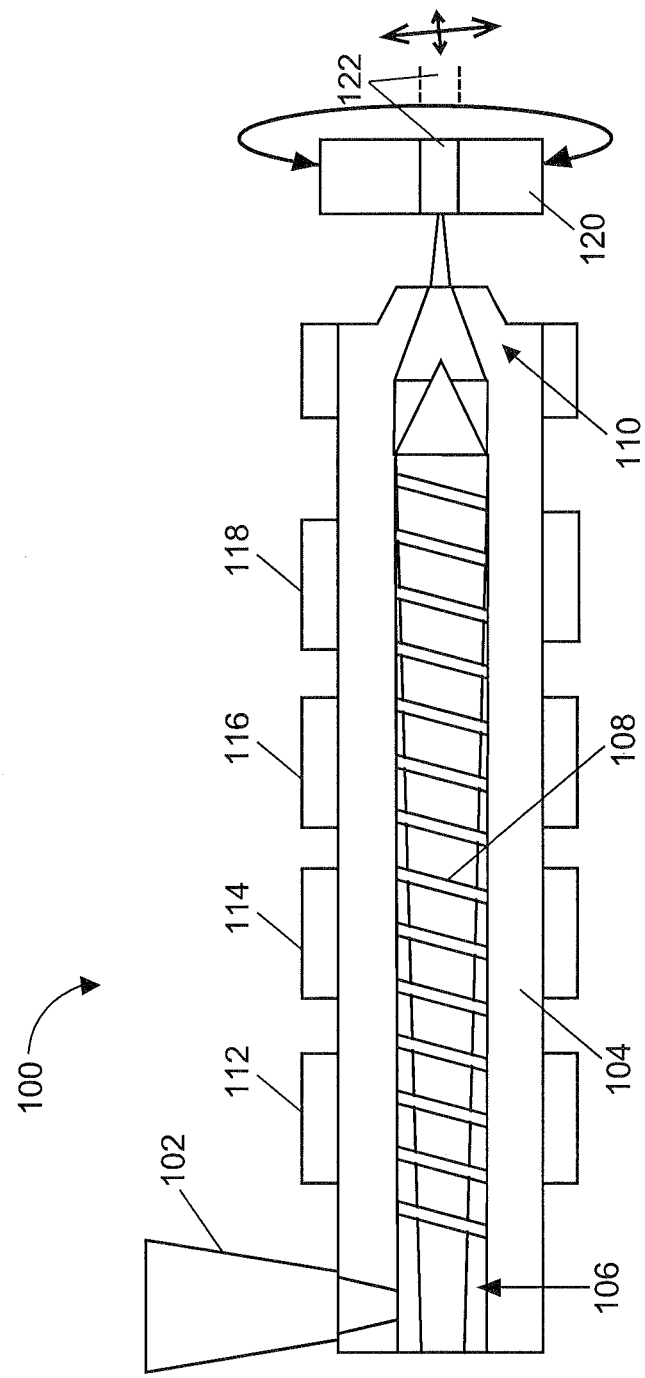
FIG. 1 is a schematic sectional view of an exemplary extruder, according to the present disclosure.

Still other objects and advantages of the present invention will become readily apparent to those skilled in the art from the following detailed description, wherein it is shown and described preferred embodiments of the invention. As will be realized the invention is capable of other and different embodiments, and its several details are capable of modification in various respects, without departing from the invention. Accordingly, the description is to be regarded as illustrative in nature and not as restrictive.

For elements common to the various embodiments of the present disclosure, the numerical reference character between the embodiments is held constant, but distinguished by the alphanumeric character to the existing reference character. In other words, for example, an element referenced at 10 in the first embodiment is correspondingly referenced at 10A, 10B, and so forth in subsequent embodiments. Thus, where an embodiment uses a reference character to refer to an element, the reference character applies equally, as distinguished by alphanumeric character, to the other embodiments where the element is common.

In accordance with the present invention, a method of manufacturing edible products is disclosed, which employs extrusion melt mixing of edible resin with selected amounts of additives, including water and other fillers, followed shaping into three dimensional articles of non-uniform shape. Such shaping may take place in a die set having an adjustable opening through which the starch-based melt exits the extruder, and/or by shaping the extrudate directly downstream of the die set with post-forming apparatus. Preferably, the products as described herein are manufactured in the form of chew toys and other similarly shaped products for pets.

Edible resin herein refers to a resin that is intended for ingestion and digestion by an animal. In that regard, edible resin herein does not include petroleum based resin products, such as polyethylene, polypropylene and/or other polymers that are sourced directly from petroleum by-products (e.g. from monomers that are derived from petroleum that are subsequently polymerized). Examples of edible resins therefore include starch, vegetable and/or vegetable protein, meat based material, etc., which are typically ingested and digested by an animal.

"Non-uniform" as used herein refers to shaped articles, such as dog chews, animal toys and the like, which do not have a profile of constant cross-section, but instead may vary in dimensions, and therefore in shape, along the length and/or width and/or height of such article. In other words, the article may preferably vary in width and height along its length.

Any carbohydrate of natural or vegetable origin, composed mainly of amylose and/or amylopectin, may be used to from the edible composition, in accordance with the present disclosure. Such may be extracted from various plants, such as potatoes, rice, tapioca and corn and from cereals such as rye, oats and wheat. The starch may also be extracted from fruits, nuts and rhizomes, or arrowroot, guar gum, locust bean, arracacha, buckwheat, banana, barley, cassava, konjac, kudzu, oca, sago, sorghum, sweet potato, taro, yams, fava beans, lentils and peas. The starch, in conjunction with any other edible material or resin, may be present at between about 30-99% including all increments and values therebetween, such as levels above about 50%, 85%, etc. Particularly preferred, however, are potato starch and corn starch flour and mixtures thereof.

The starch employed herein may be raw starch, which may be understood as starch that has not seen a prior thermal molding history, such as extrusion or other type of melt processing step. However, the starch herein may, e.g., be heated for drying purposes, which would not amount to a prior thermal molding history. The raw starch itself may also be native, which may be understood as unmodified starch recovered in the original form by extraction and not physically or chemically modified. The raw starch may also be in powder form of varying particle size, which may be understood as milled and/or pre-sifted. It should be understood that the raw starch may also have varying degrees moisture present.

The starch composition may include cellulose. The cellulose may be, for example, a long-chain polymer of polysaccharide carbohydrate. The cellulose may also be derived or extracted from plants. The cellulose may be incorporated into the starch composition between about 1-15% by weight of the starch composition and any increment or value therebetween, including 4%, 10%, 11%, etc.

Emulsifiers or surfactants may also be incorporated into the starch composition. The emulsifier may be present between about 1-10% by weight of the starch composition and all increments or values therebetween, including 3%, 4%, etc. The emulsifier may include, for example, lecithin, which may be extracted or derived from, for example, egg yolk or soy beans.

The starch composition may also include a plasticizer. The plasticizer may include for example, glycerin. The plasticizer may be incorporated between about 15-30%, including all increments and values therebetween, such as levels greater than 15%, 21%, 27% etc.

A humectant may also be incorporated into the starch composition. The humectant may include, for example, oat fiber. The humectant may be incorporated between about 0.1-5% by weight of the starch composition including all intervals and values therebetween, including 1%, 25%, etc. A humectant may be understood to be any additive that may absorb water in the material.

The edible resin (e.g. starch) composition may also include water. The water may be introduced into the composition at between about 1-40% by weight of the starch composition and any increment or value therebetween in 1% increments, including e.g. 2-39%, 3-38%, etc. Preferably, the water level is such that it is sufficient to allow for the composition to be formed continuously in the die at temperatures the avoid resin degradation. Such preferred levels may be 10% by weight to 30% by weight, or 10% by weight to 20% by weight, or 10% by weight to 15% by weight, which then begins to approach the desired water level in the final product (i.e. 10% by weight to 15% by weight).

Accordingly, after the product has been formed, the water may be present between 10-15% by weight of the edible (e.g. starch) composition including all increments or values therebetween, such as, 10%, 11%, 12%, 13%, 14% or 15% by weight. However, in accordance with the present disclosure, those skilled in the art will recognize that the values are only preferred, and other levels of water may be optionally selected within the broad teachings provided herein.

The edible (e.g. starch) composition may include a nutraceutical. The nutraceutical may be fermented soya. Fermented soya nutraceuticals are available from Bio Food, Ltd., Pine Brook, N.J. and sold under the general trademark Soynatto®. The fermented soya may be present between about 1-40% by weight of the starch composition, including all increments and values therebetween, including 10%, 20%, etc.

The edible (e.g.) starch composition may also include enzymes and/or co-enzymes which are similarly available through Bio Foods, Ltd., Pine Brook, N.J. and sold under the trademark of BT-CoQ10®. This reportedly is a biologically transformed (fermented) cell mitochondrial coenzyme and contains Coenzyme Q10, antioxidants, phytonetrients and cofactor mineral nutrients and other cell constituents. The enzymes and/or co-enzymes may be present between 0.1-10% by weight of the starch composition, including all increments and values therebetween such as 1%, 5%, etc.

Other additives may be introduced into the composition as well. These additives may include vegetable matter, fruit matter, rawhide, nuts, nut bits or nut flour such as peanut flour, and animal or fish products, by-products, meal or digests, etc. Glutens may also be incorporated into the starch composition. Gluten may be understood as water-insoluble protein complex extracted from cereal grains such as maize or corn and wheat. These additives may be present individually or cumulatively between about 0.1-50% by weight of the starch composition and all increments and values therebetween, including 0.1-5.0%, 15%, 25%, etc.

Additionally, flavorants, herbs, herbal extracts, vitamins, minerals, colorants, yeast products, attractants, etc, may be incorporated into the edible (e.g. starch) composition. Yeast products may include nutritional yeast or brewers yeast such as *saccharomyces cerevisiae*, dairy yeast such as *kluyveromyce marxianus* or wine yeast such as *saccharomyces fermentati*. Attractants may include compounds listed herein, such as the animal or fish digests, or other compounds that may increase an animal's interest in the starch composition. These additives may be present individually or cumulatively between about 0.01-25% by weight of the starch composition and any increment or value therebetween, including 0.01-0.5%, 10%, 20%, etc. The composition may also include calcium carbonate. The calcium carbonate may be present between about 5-10%.

The edible (e.g. starch) composition may be introduced directly into the barrel of an extruder 100, illustrated in FIG. 1, through a hopper or other feeding device 102. It is contemplated that in a preferred method, the ingredients in the starch composition may be blended together prior to introduction into the hopper, the ingredients may also be blended into a plurality of sub-formulations and added to the hopper, or even introduced individually into the hopper. Various feeding devices for introducing the additives into the barrel may be contemplated including loss-in weight gravimetric blenders/feeders, auger feeders, venturi loaders, etc.

Those skilled in the art will appreciate that an extruder 100 may typically contain a barrel 104 including a feed section 106, a screw 108 and an output nozzle 110. The barrel 104 may include a plurality of temperature control zones 112, 114, 116, 118 in the barrel extending from the feed section 106 to the nozzle 110. The nozzle may feed a profile die 120, capable of being adjusted such that the orifice 122 in the die may be adjusted in shape as the extrudate is exiting so that the extrudate may vary in shape and may cool to form animal toys or chews having non-uniform dimensions. The arrows adjacent the die 120 indicate that the die may be capable of being rotated relative to the extrudate, and/or that the die orifice 122 may be opened or closed as needed to vary the profile shape and size during the extrusion process such that the width and thickness of the extrudate may be varied vs. the length to provide non-uniform shapes.

"Extrudate" as used herein refers to a molten composition that is forced through a shaping orifice as a continuous body and which is capable of maintaining the approximate shape of that orifice, unless otherwise acted upon, until the composition cools.

Table 1 below illustrates a range of various processing parameters for manufacturing the non-uniform shaped products of the present disclosure.

TABLE 1

| Comparative Extruder Parameters | | |
|---|---|---|
| Throughput | 50-150 kg/hr | 300-600 kg/hr |
| Screw Diameter | 70 mm. | 72 mm. |
| Screw Length | 940 mm. | 2300 mm. |
| L/D | 13 | 32 |
| Extruder Type | single screw | twin screw |
| Initial H$_2$O Level | 20-40% | 10-15% |
| Max. Heating Zone | 300° F. | 390° F. |

The various heating zones in the extruder may be set at different temperatures so that a homogenous blend of ingredients having the ability to flow under pressure can be provided as a melt to an adjustable extrusion die. By providing a temperature profile along the barrel from feed zone to the die, combined with a given residence time and shear rate, thermally sensitive ingredients may be included in the starch composition without total degradation.

In addition, the melt in the barrel of the extruder may be exposed to a shear rate between the screw and the barrel of the extruder while plasticating is taking place, and the shear rate range may be in the range of about 1 sec$^{-1}$ to about 5,000 sec$^{-1}$ and all increments therebetween (for instance, such as 1000 sec$^{-1}$, such as 900 sec$^{-1}$ or 800 sec$^{-1}$ or 700 sec$^{-1}$, etc.).

Preferably, at least 0.1-50% of the thermally sensitive additives, such as vitamins, minerals and herbs, remain non-degraded, most preferably at least 75%, even more preferably at least 80-90%, and in the most preferred embodiment, over 90% of the thermally sensitive additives are not thermally degraded by the molding process. This approach then allows such additives to be distributed in the molded chew toy of the present disclosure and in a preserved state such that their nutritional or therapeutic value is maintained.

In one exemplary embodiment, the water content of the edible (e.g. starch) composition within a preconditioner (prior to extrusion) may first be set in the range of about 10-40% by weight with respect to that of the starch, which mixture may be achieved by mixing the starch with water in a Wenger DDC Preconditioner that provides controlled pre-moisturization and complete mixing of the water with the starch material. This may then be followed by placement of the starch/water composition into an extruder, and in that regard, preferably, a Wenger TX Magnum Extruder, available from the Wenger Company. While twin-screw operation is preferred, it is contemplated that single screw extruders may be used. Finally, in the context of the present disclosure, where the water level charged in the extruder may be preferably lowered during the course of extrusion, an extruder capable of venting may be employed, wherein such venting lowers the water level to a desired level. To facilitate such water level change, it may be preferable to apply a light vacuum to the extruder to thereby provide a more efficient removal of water from the extrudate therein.

Figure 2:
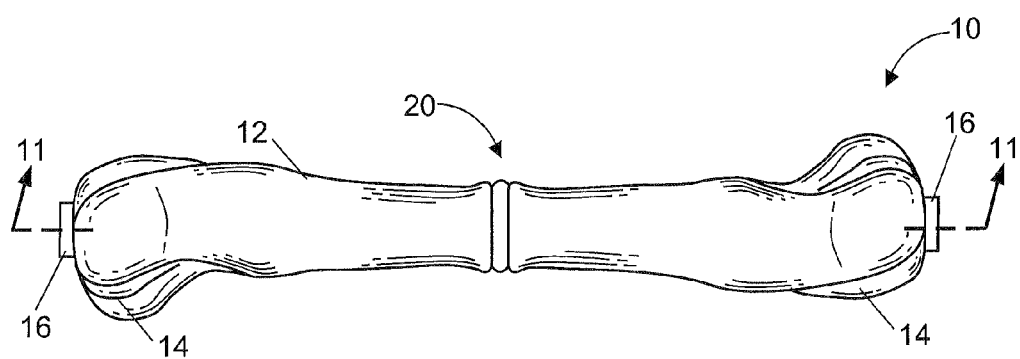
FIG. 2 is a side view of an exemplary dog chew, according to the present disclosure.
Figure 3:
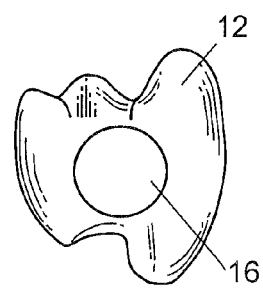
FIG. 3 is an end view of the dog chew of FIG. 2.

FIG. 2 is a side view of an exemplary dog chew 10, according to the present disclosure including a central shaft 12 and bone-like condyles 14 at each end. FIG. 3 is an end view of the dog chew of FIG. 2. Reference numeral 16 is a connecting portion which extends between adjacent chews as they are formed by extrusion to allow the extrudate to be handled in continuous form and then separated into individual chews later (for packaging, at the store, or in the home, as needed). Reference numeral 20 represents one example of how the cross-section of the chew may be varied in size and shape during the extrusion process. It should further be noted that the shaft 12 as shown is not of a constant cross-section, as one might expect from an extrusion process, and that the ends 14 of the chew 10 vary even more in shape (particularly see FIG. 3). Such a dog chew may be formed by using a die for the extrudate in which the orifice in such die may be varied in dimensions as the extrudate is being forced therethrough to produce the non-uniform shape, for example, of FIG. 2.

In a first exemplary embodiment, the orifice in the extruder die may be formed of a plurality of interacting plates, the plates each having a shaped partial opening therein, the plates capable of sliding against one another so that the partial openings at least partially coincide and provide a cross-section (orifice) of the desired shape (see crossed arrows in FIG. 1.). The plates may be varied in relative position to each other so that a small connecting portion (such as 16 in FIG. 2) may be formed, or a bulbous shape (such as condyle 14 may be formed), the partial opening in each individual plate cooperating with the partial openings to form a portion of the periphery of the extrudate. Further, an intermediate shaped opening (such as to form the shaft 12 of the chew of FIG. 2) may be formed. The relative positioning of the plates as the extrudate is being forced through the die allows a varied non-uniform shape, such as shown in FIG. 2, to be formed. The plates may be moved by motorized, pneumatic or hydraulic means and the means may be programmable. The connecting portion may have smaller cross-sectional dimensions than the main portion or the end portions of the chew toy, smaller meaning in the range of about 10% to about 95% and all increments in between (for instance 11%, 25%, 55%, etc.).

Figure 4:
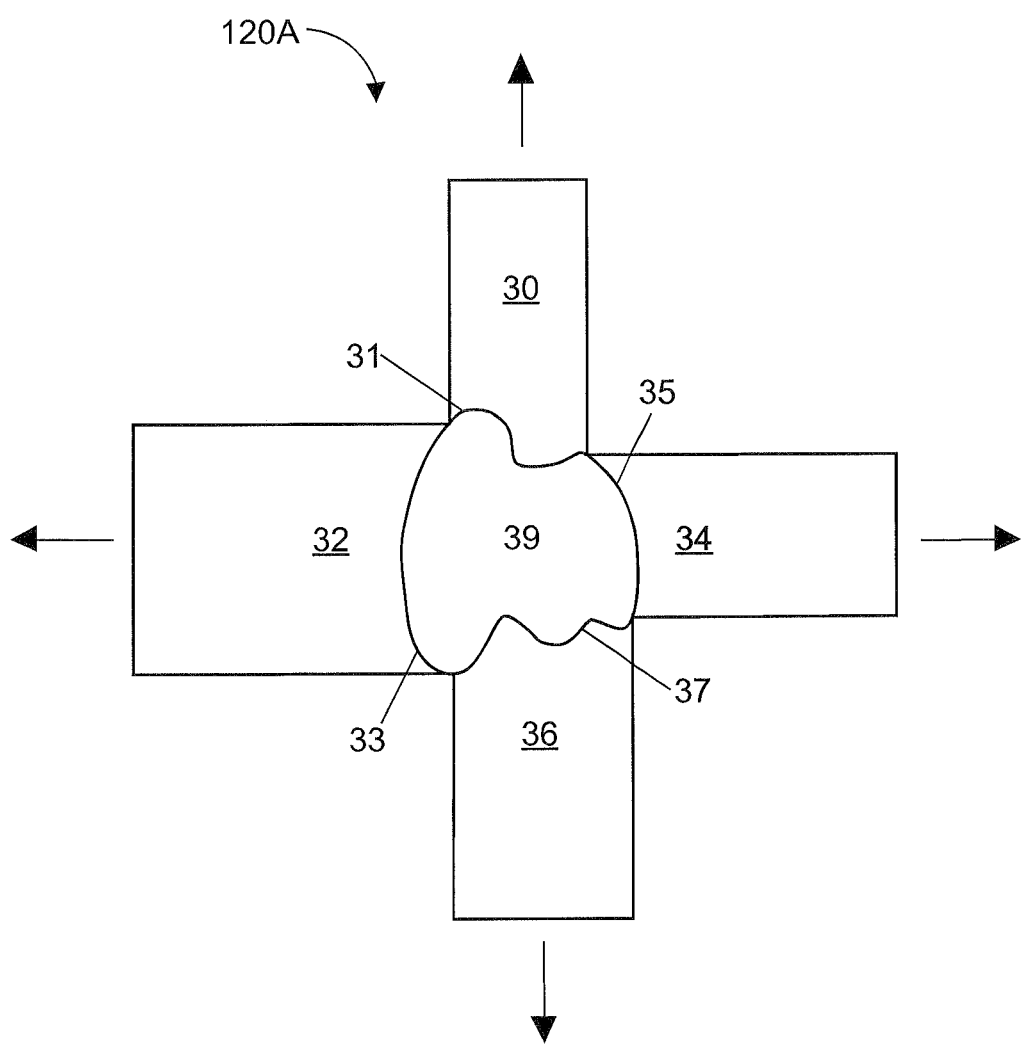
FIG. 4 is a front view of a first exemplary embodiment of an adjustable die for forming the dog chew of FIG. 2, including a plurality of interacting adjacent sliding plates spread apart to form a shaped orifice for an extrudate.

Expanding upon this description, as shown in FIG. 4, a plurality of adjacent slidable plates, 30, 32, 34 and 36, each having a partial opening 31, 33, 35 and 37 formed along one end, may be moved in the direction of the arrows to vary the dimensions of the combined opening, orifice 39, between them, thus providing an adjustable cross-section die 120A (for instance, for condyles 14 of FIG. 2) that the extrudate may be formed into. The partial openings 31, 33, 35 and 37 may each be configured as complex curves which when interconnected by specific positioning of the slidable plates 30, 32, 34, 36 form, for instance, one or more cross-sections for the article to be extruded. Closing the plates relative to one another may form a somewhat smaller opening, for instance extrudate forming the shaft 12, and further closing the plates relative to one another may yield the cross-section shown in FIG. 3 as a connecting portion 16. Accordingly, a continuous extrusion process may be operated to yield articles of varying, non-uniform cross-section which are interconnected and may be separated for individual use later.

In one exemplary embodiment, as shown in FIG. 3, the extrudate may include one or more shaped ends 14 with a cross-sectional dimension that exceeds the cross-sectional dimension of another portion 16, 20 of said extrudate wherein said one or more shaped ends 14 includes a plurality of projecting surfaces. Such shaped end may be a bulbous shape, such as condyle.

Figure 5:
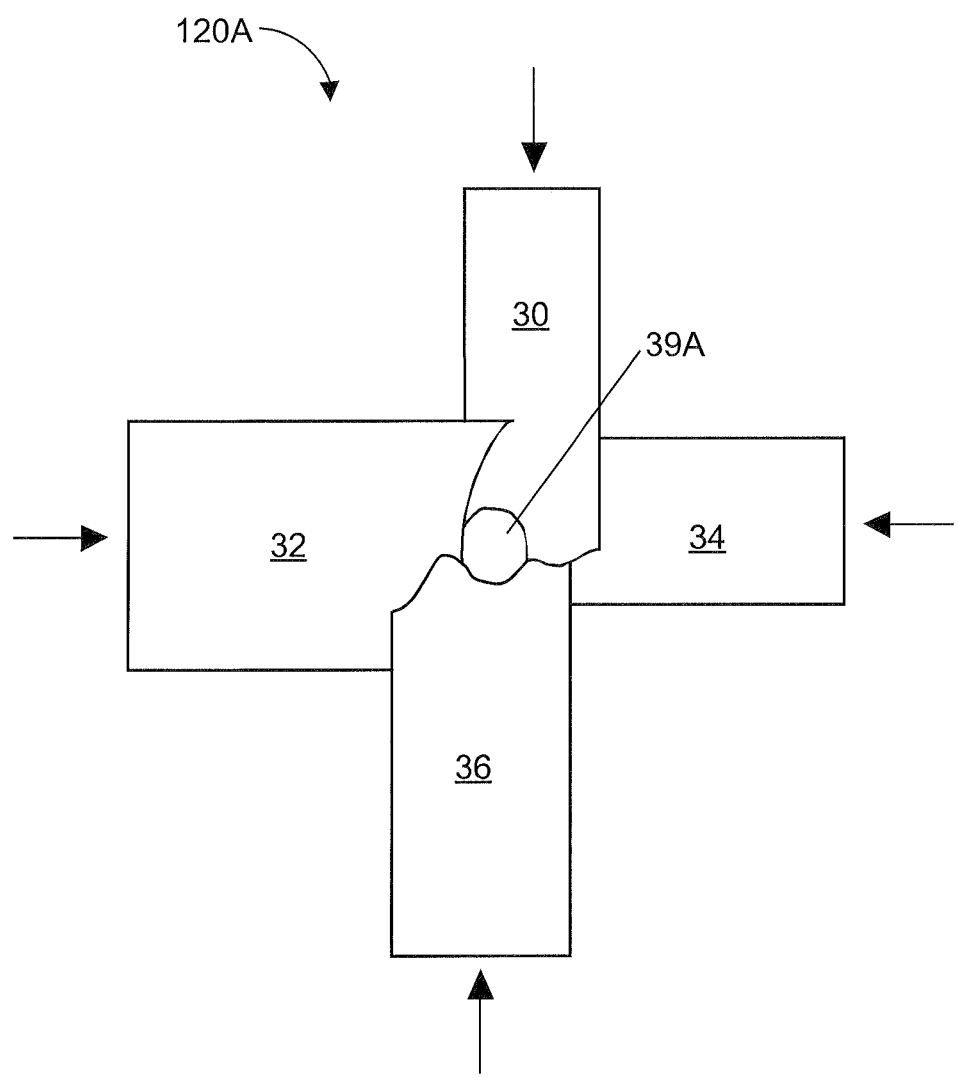
FIG. 5 is a front view of the sliding plates of FIG. 4 in a nearly closed-off position to provide an orifice for a connecting portion between chews.
Figure 7:
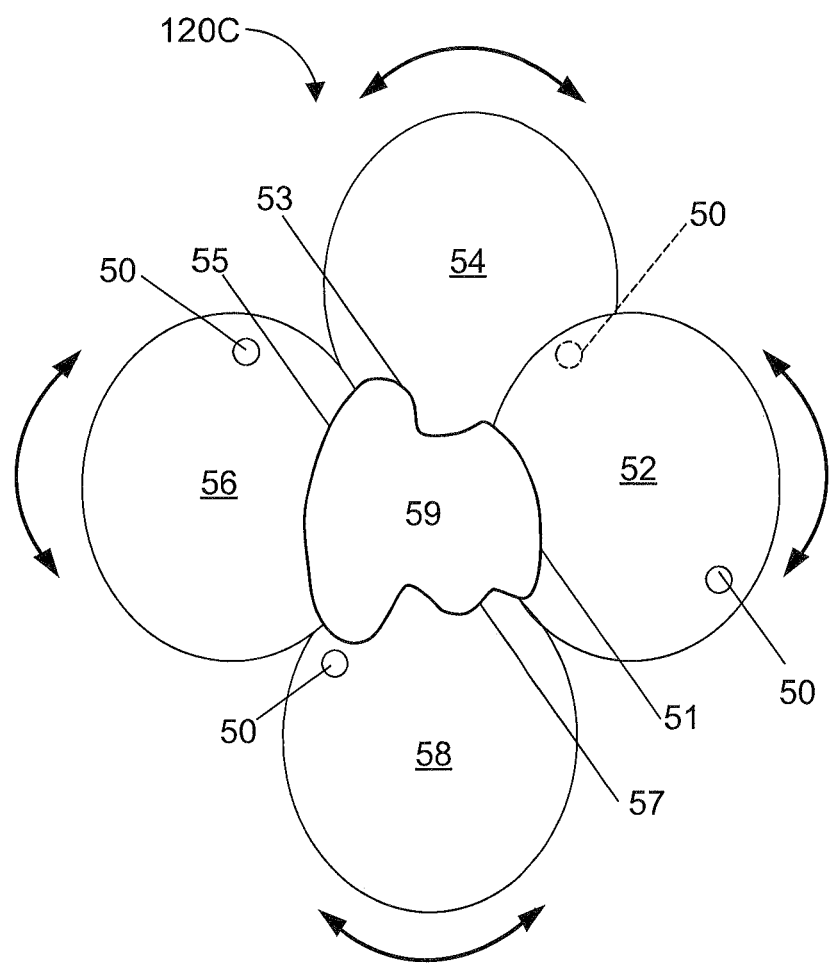
FIG. 7 is a front view of another adjustable die including plates which cooperate in a rotary manner to form an adjustable opening for an extrudate.

FIG. 5 illustrates the plates of die 120A in a position of being nearly totally closed together to form an opening 39A from which the extrudate may form the connecting portion of the dog chew 16. While FIGS. 4 and 5 illustrate 4 interacting slidable plates, any number may be used, the greater the number, the finer the detail of the features of the exterior of the extrudate. It is further contemplated that the plates may cooperate in other the linear sliding fashion and that they may rotate relative to one another, in iris-fashion, or some combination of rotary and linear interaction. FIG. 7 illustrates the use of 4 adjacent plates 52, 54, 56, 58 that interact on a rotary basis by rotating around pivot points 50 (note arrows). Each plate includes a complex curved edge 51, 53, 55, 57 which cooperate when properly positioned relative to one another to form the cross-section 59 of die 120C which can produce an extrudate with the shape of the condyle of FIG. 3.

In a related embodiment, the die may be rotated around the extrudate as it emerges to cause the detailed features such as the condyles to be formed in a non-linear fashion relative to the longitudinal axis of the dog chew. In other words, the extrudate may be formed with a twist by rotating the die around the longitudinal axis of the extrudate. See elliptical arrow in FIG. 1. This may provide an even greater variety of extruded non-uniform shapes.

Figure 15:
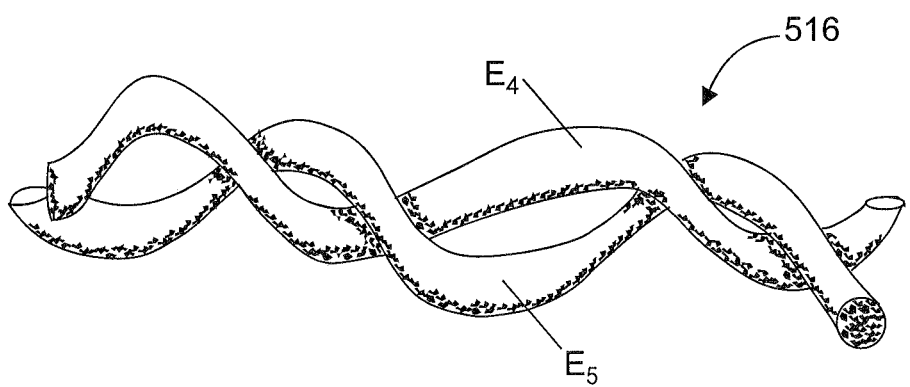
FIG. 15 is a perspective view of another exemplary dog chew, formed by a pair of rotating extrusion dies, according to the present disclosure.

In another related embodiment, an extrusion die may include a plurality of orifices from which extrudate may be extruded, for instance 2, and the die rotated relative to the streams $E_4$, $E_5$ of extrudate to form the "twisted" dog chew 516 as shown in FIG. 15. In other words, the dies may be rotated around a plane located between the dies. It is further contemplated that $E_4$ and $E_5$ may have different compositions, and/or properties to provide variety in the chew toy.

Figure 6:
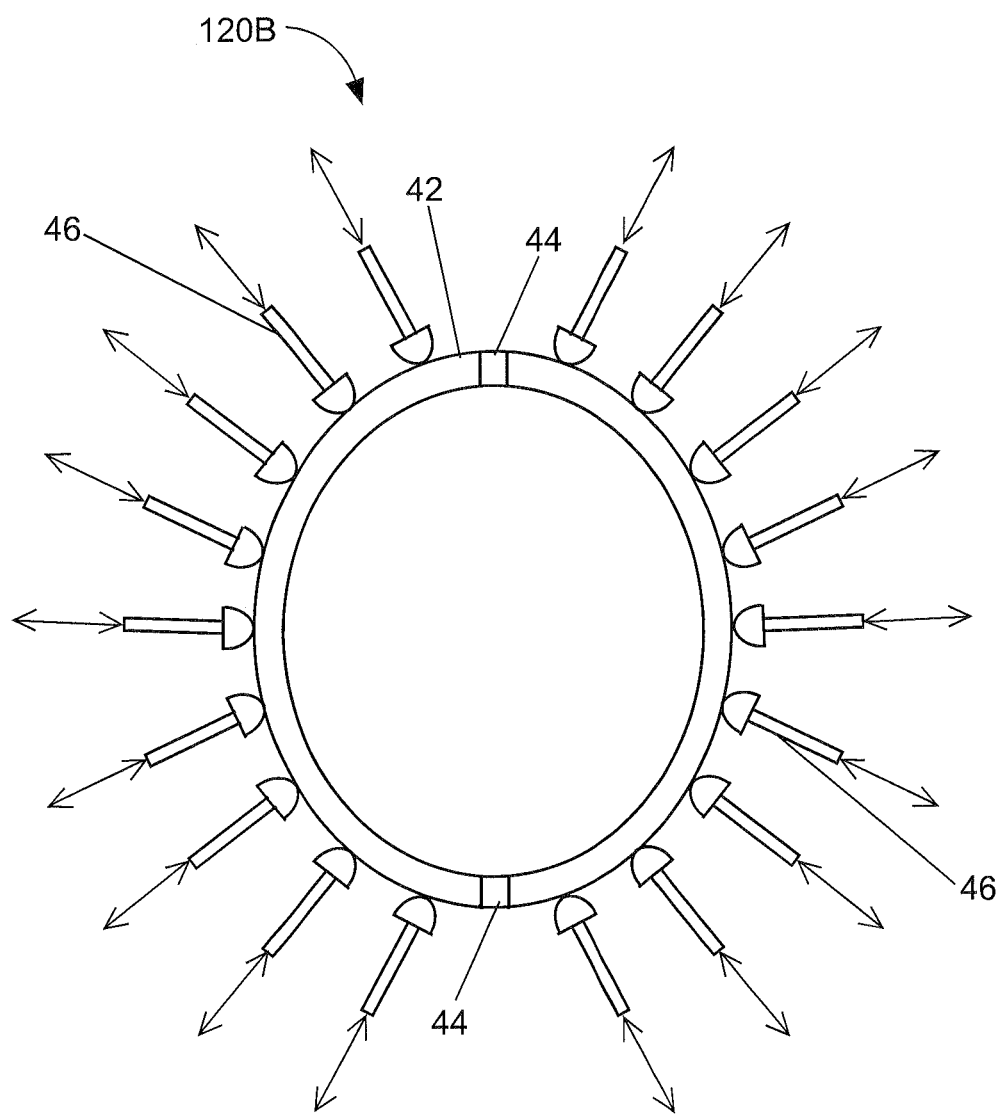
FIG. 6 is a front view of another adjustable die including a flexible ring or tube that may be deformed to a desired shape by external stroking members

In a another exemplary embodiment, the adjustable die 120B may comprise a flexible member in the form of a ring or a tube 42 that can be deformed into various shapes by locally applying pressure to one or more areas on the periphery of the ring or tube. FIG. 6 illustrates a ring or tube member 42 preferably formed of a relatively heat resistant and flexible plastic or rubber that can withstand the temperatures encountered in the extrusion of starch-based compositions. A plurality of stroking members 46 may be located around the periphery of the ring, the stroking members capable of extension and retraction such that such extension and or retraction may cause the ring, or tube, to change shape and vary the shape of the extrudate being forced through it. The stroking members may be attached to the ring or tube 42 so that outward distortion of the round shape may take place, as well as inward displacement.

In the case of a tube, the stroking members may include elongated rods or blades (not shown) that run along the length of the tube to deform the tube substantially along its entire length. In a related embodiment, the stroking members may be configured to vary the cross-section of the opening along the length of the tube such that the cross-sectional shape of the extrudate is gradually reduced from the entry point of the extrudate into the tube to the exit point where the final shape is configured, and accordingly may reduce any sharp increase in back pressure or overworking of the melt. While shown in FIG. 6 as round, the original cross-section of the ring or tube 42 may be any shape that allows the desired cross-section of the extrudate to be formed, including combinations of geometric shapes and complex curves including, for instance, the shape of the condyle of the dog chew of FIG. 2. Preferably, the ring or tube may include one or more stabilizers 44 to aid in controlling the deformation of the original shape.

The stroking members 46 may be in the form of pneumatic or hydraulic cylinders with variable strokes to cause the ring or tube to locally change shape. The stroking distance and order may be programmed to be varied as the extrudate is being forced through the die 120B.

In a related embodiment, the ring or tube 42 of FIG. 6 may be acted upon from the outside by the sliding plates illustrated in FIGS. 4, 5 and 7 (instead of the stroking members) to deform the ring and cause the ring to be shaped into the desired orifice for the extrudate. This may be of use when the viscosity of the extrudate is low enough to cause sealing problems between the adjacent sliding plates.

Figure 8:
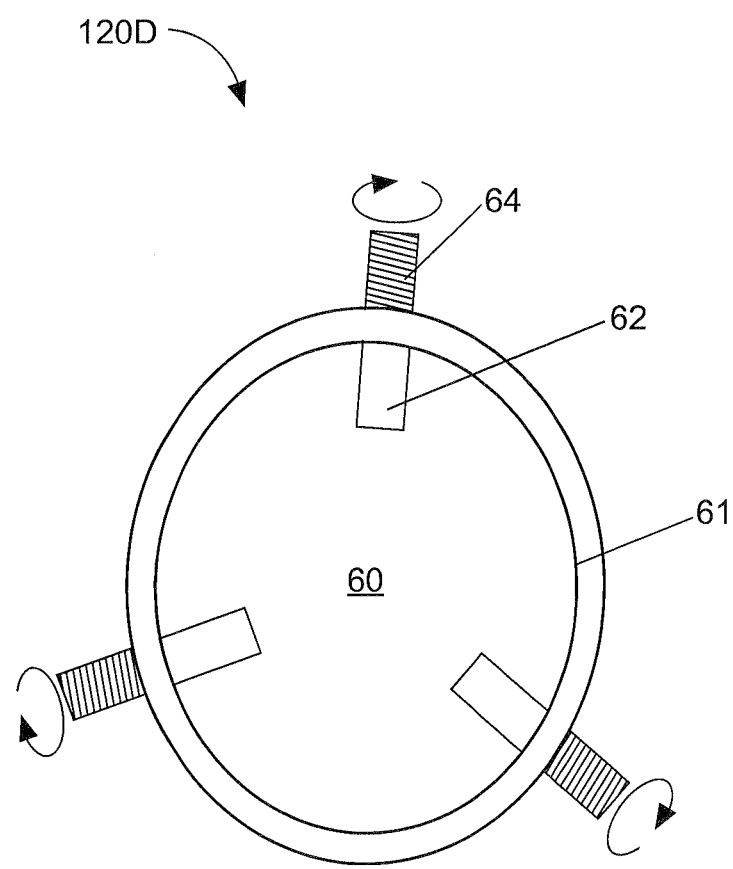
FIG. 8 is a front view of an adjustable extrusion die which includes adjustable protrusions that may form a portion of the periphery of the die and be adjusted in depth to vary the shape of the die opening.

In another exemplary embodiment, an extrusion die 120D (see FIG. 8) may be configured to form an orifice 60 for a starch-based melt at the output of an extruder, the orifice of any geometric shape desired for an animal chew or pet toy. Portions 62 of the periphery 61 of the orifice 60 may be displaced to manipulate the shape of the orifice, and the shape of the melt that is forced through the orifice. FIG. 8 illustrates one means of displacement which includes protruding portions 62 which may be varied in depth of protrusion by threaded sections 64. It is contemplated that the die could also have movable blade portions. As the melt is forced through the orifice 60 it may be desirable to vary the depth of one or more of the protrusions 62 to form grooves, or undulations, or bumps in the periphery of the extrudate. The protruding portion may be moved by motorized, pneumatic or hydraulic means and the means may be programmable.

In addition, the die and/or the extrudate may be twisted relative to one another to form the features on the extrudate in a spiral fashion (see elliptical arrow in FIG. 1). The die can be rotated by attaching a chain or belt driven by a motor. The extrudate may be twisted by attaching a puller and then rotating the puller around the extrudate to impart a twisting force. Accordingly, an extrudate with external features including a twist to such may be provided.

In a related embodiment, the extrudate from die 120D may be directed into a tube having a pattern of spiral grooves or protrusions, so that at some point in the cooling of the extrudate, a relatively small twist may be imparted to the extrudate, as opposed to externally rotating the die or extrudate.

It is contemplated that individual dog chews of a given non-uniform shape may be cut from a continuous extrudate using rotating knife blades, a guillotine, hot wire, or the like. In one exemplary embodiment, the extrudate may be cut using a "gang cutter" with a plurality of blades, the cutter reciprocally traveling with and against the direction of travel of the extrudate such that it severs a plurality of connecting portions at once and in so doing, does not significantly affect the rate of extrusion. In other words, 2 or 10 or 20 chew toys, for instance, may be cut at the same time from the extrudate using a cutter with a plurality of spaced apart blades. Accordingly, the rate of extrusion may be effected by only about 5% or about 10%.

It is also contemplated that the extruder feeding the shape-forming die may include an accumulator so that changes in throughput of the extrudate caused by the variance in shape of the die may be accommodated without substantial effect on the quality of the melt in the barrel, or so that intermittent output may be possible. The accumulator may be positioned at a location upstream of the die wherein the melt is conveyed through the extruder and into the accumulator and then through the die.

In another exemplary embodiment, a dog chew or animal toy may be formed into a three dimensional shape by providing extrudates from a plurality of extrusion dies and combining such to form multiple lobes of a dog chew. "Lobe" or "lobed" as used herein refers to a rounded projection that extends from another shape, such as a four leaf clover has four lobes.

Figure 9B:
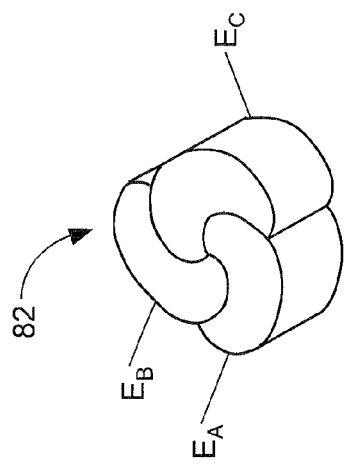
FIG. 9B illustrates the addition of a third like-shaped extrudate to form a three-lobed dog chew.
Figure 9D:
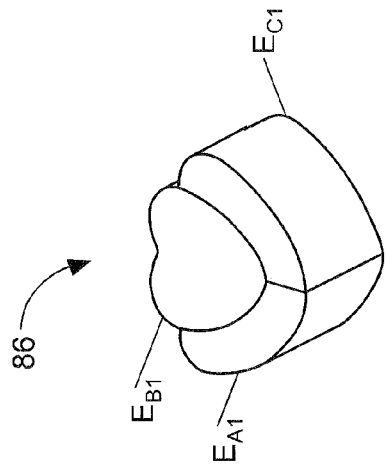
FIG. 9D illustrates the addition of a third heart-shaped extrudate to form a different lobed dog chew.
Figure 9A:
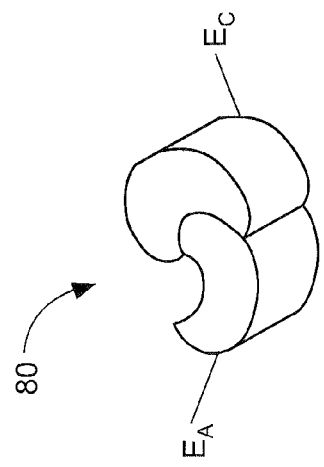
FIG. 9A is perspective view of an exemplary dog chew formed by extruding two similar "comma-shaped" extrudates and combining them.

FIG. 9A illustrates a dog chew 80 formed by combining two "comma-shaped" extrudates $E_A$, Ec from two separate but identical dies (see FIG. 10) in a shaping die and cutting the product to length. FIG. 9B illustrates the addition of a third extrudate $E_B$ of similar cross-section fed to an adjusted shaping die to yield a different, 3-lobed shape 82.

Figure 10:
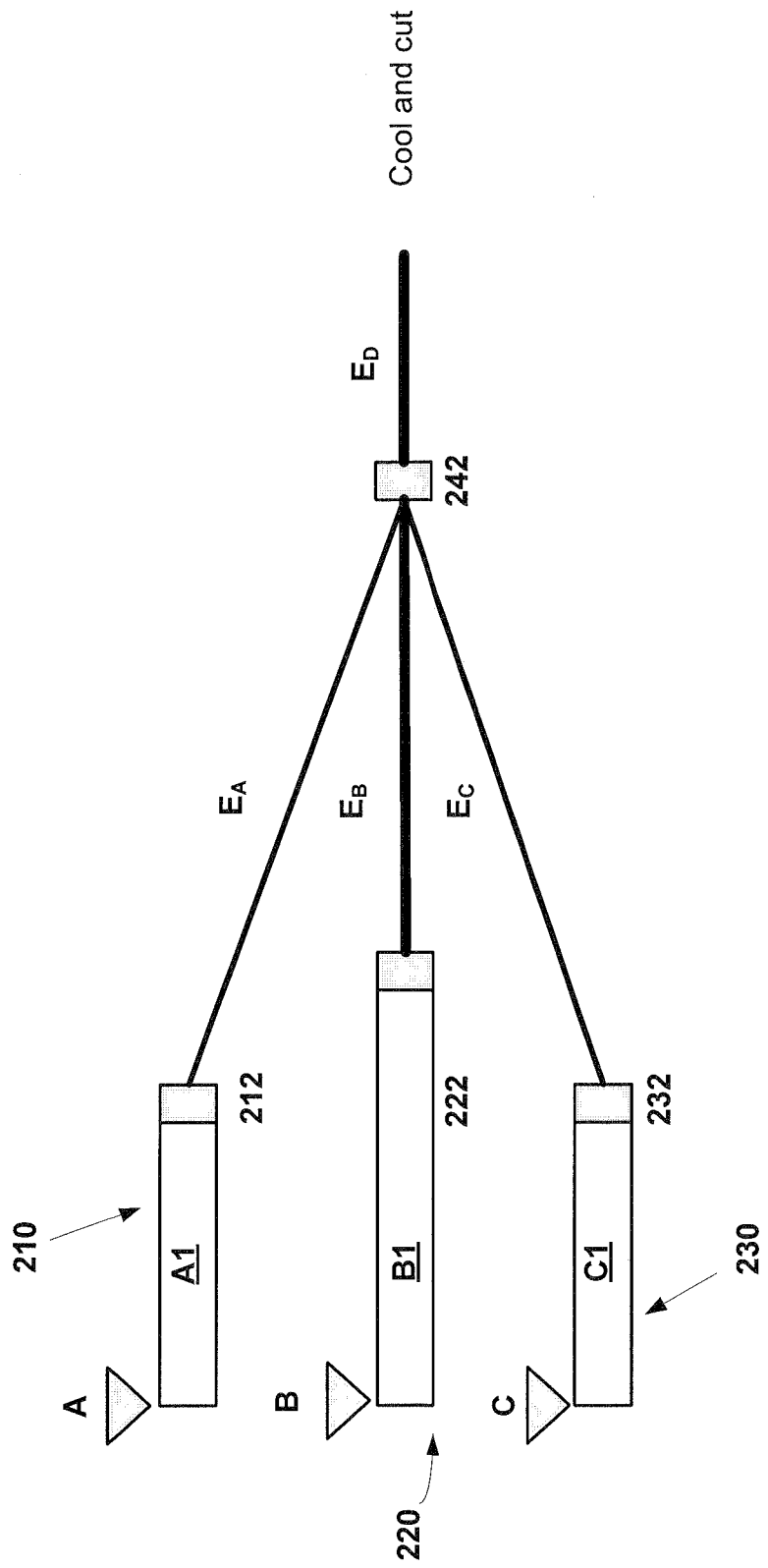
FIG. 10 is a schematic representation of a flow chart of the process and apparatus for producing the dog chews of FIGS. 9A-9D.

FIG. 10 illustrates a schematic configuration for providing such lobed shapes, including a plurality of extruders 210, 220, 230 each with a profile die 212, 222, 232. Consistent with FIG. 9A, extrudates $E_A$ and $E_C$ may be formed to the desired shape in dies 210, 230 and those extrudates combined in shaping die 242 while the melts are still capable of being shaped and adhered together. This may then produce, for instance, an extrudate $E_D$ having the profile as shown in FIG. 9A and when cut to length, form a shaped dog chew. By adding a third extrudate $E_B$ from extruder 220 and die 222, and adjusting the shape of the combining die 242, a shape 82 having a third lobe $E_B$ as shown in FIG. 9B may be manufactured as part of a continuous manufacturing process.

Figure 9C:
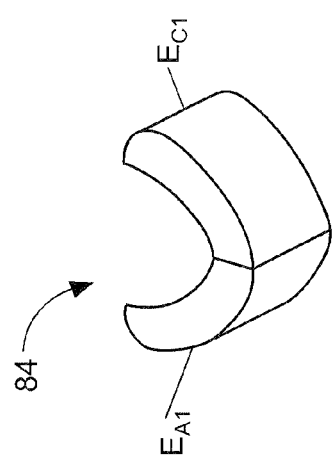
FIG. 9C is perspective view of an exemplary dog chew formed by extruding two similar curved extrudates and combining them.

In a related embodiment, dissimilar shaped extrudates may be combined to form other dog chews of varying shape. FIG. 9C illustrates the combination of two similar extrudates $E_{A1}$ and $E_{C1}$ having curved profiles that may be combined in a shaping die and cut to length to form a "V" or "U"-shaped dog chew 84. The addition of a heart-shaped lobe, extrudate $E_{B1}$, provides a different shape 86, as shown in FIG. 9D.

By intermittent processing of the third extrudate through the third die, different shapes of combined extrudate may be provided as two and then three streams may be combined.

In another exemplary embodiment to provide dog chews or animal toys with non-unifrom, three dimensional shapes via extrusion, a starch-based edible composition may be formed into an extrudate by forcing the melt through an extrusion die and directly thereafter placing the extrudate between matched tooling to form the desired shape. The tooling may be such that the chews/toys are separated as part of the forming process or a connecting portion (see 16 in FIG. 2) may be formed connecting adjacent shapes such that a continuous stream of chews/toys are formed. In this manner, the process may be continuous.

FIG. 11 illustrates one exemplary embodiment of a device for directly forming the extrudate into a desired shape on a continuous basis. Interacting wheels 300, 302 may be provided having a plurality of mating cavities 320 placed or machined into the outer periphery of the wheels 300, 302, the cavities 320 each comprising one half of the shape of the dog chew of FIG. 2 (for instance, see FIG. 1 where a section has been taken along line 11-11 longitudinally along the chew). As the extrudate 304 exits the extrusion die (note left arrow in FIG. 11), it is passed between the wheels 300, 302 and formed to shape by the matching cavities 320. The matching cavities 320 comprise complementary shapes which when matched together by positioning of the interacting wheels form a mold set having a combined cavity with the shape of, for instance, the dog chew of FIG. 2. One or more cutting blades 306 may be provided on one or both wheels 300, 302 which severs the extrudate 304 as it passes between the wheels.

Figure 11A:
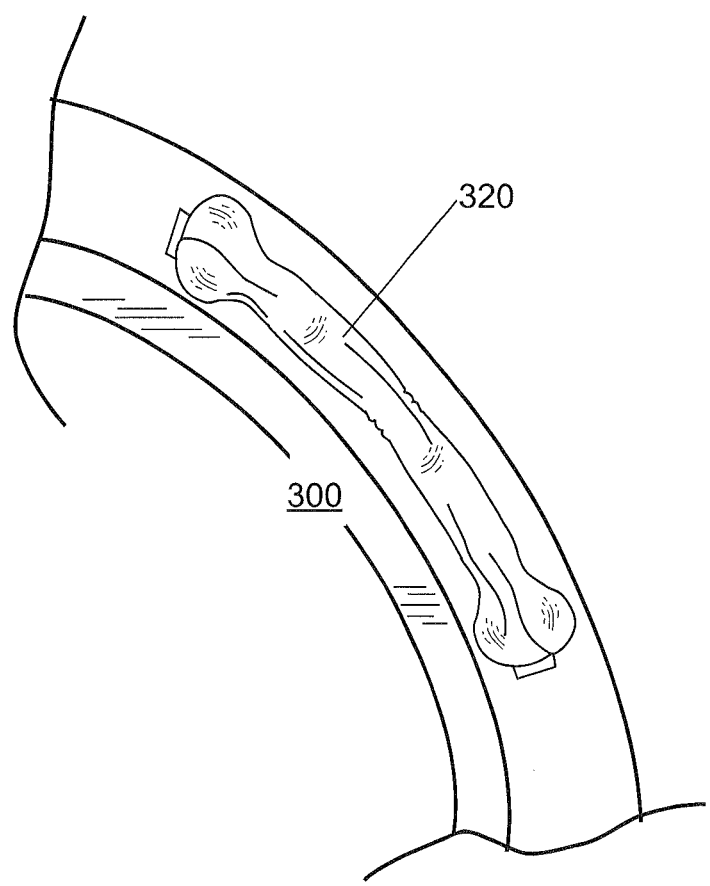
FIG. 11A is an enlarged view of one of the mold cavities of the interacting wheels of FIG. 11.

FIG. 11A is an enlarged side view of one of the matching cavity portions of wheel 300 of FIG. 11 and illustrates one of the half cavities 320 that may match a complementary cavity of wheel 302 such that when the cavities are forced together by the interaction of the wheels, an article having the shape of the combined cavities (for instance the dog chew of FIG. 2), may be formed.

In a related exemplary embodiment, the lower wheel 302 shown in FIG. 11 may be replaced with a stationary surface and as the extrudate 304 exits the extrusion die (note left arrow in FIG. 11), it is passed between the upper wheel 300 and the stationary surface and formed to shape by the cavity 320. In such a process, the dog chew 10 may be formed with a constant profile, such as flat, on that lower surface. It is further contemplated that the stationary surface may be concave and the lower surface of the dog chew may then include a convex or curved surface.

FIG. 12 is a side view of a similar apparatus for forming elongated shaped dog chews comprising a pair of cooperating belts 400, 402, which are equipped with a series of matched cavities 420 along their surface. The belts 400, 402 may be stretched between rollers 408. As the extrudate 404 is fed between the belts (see left arrow), the matched cavities are closed together to form a combined cavity of the desired shape and the extrudate is shaped within the matched cavities 420. The output may be, for instance, a dog chew 10 having the shape of that shown in FIG. 2.

It is contemplated that complementary knife blades may be placed appropriately along the belts of FIG. 12 to sever the dog chews into segments including one or more dog chews. In addition, it is contemplated that connecting portions 16 may be formed between adjacent dog chews by the placement of connecting slots between adjacent cavities, or that no slots may be present and individual, separated chews may be formed by the matched cavities.

In yet another exemplary embodiment, the extrusion die may be moved relative to a molding surface to form non-uniform, three dimensional shaped dog chews. FIG. 13 is a schematic representation of a work station for extruding a melt of extrudate onto a surface by feeding the melt to a die whose position is controlled by a guiding apparatus, such as a multi-axis robot, x-y table or the like. The device may be programmed to lay the extrudate in a defined pattern on the surface of a molding table or may be programmed to distribute a given quantity of extrudate into a mold cavity placed on the table. The extruder 100 like that shown in FIG. 1 may include a plurality of heating zones 112, 114, 116, 118 and an extrusion die 120. The extrusion die 120 may be connected to the end of the arm 502 of a robot 500 by a flexible coupling 506 capable of delivering the melt to the robot and capable of some flexing to allow the robot head 504 to move in a predetermined pattern to deliver the extrudate E to a molding surface 520. A control unit 508 for the robot 500 provides signals to vary the position of the head vs. the molding surface, and therefore the location of the extrudate E emanating from the head.

In addition, it is contemplated that the extrusion head 504 may be stationary and that the molding surface 520 may be moved in crosswise, lengthwise and vertical planes ("X", "Y" and "Z") directions relative to the head to manipulate an extrudate E from the die into a complex shape (for instance a pretzel shape, a word or phrase in cursive 510, etc.

Figure 13A:
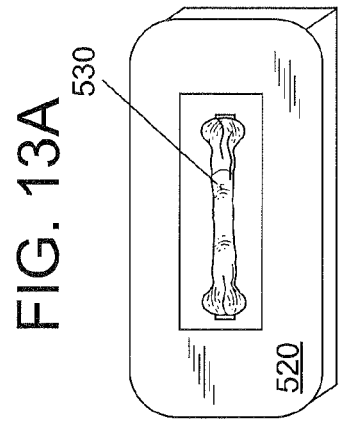
FIG. 13A is a perspective view of a different molding surface of FIG. 13, including a mold cavity for a dog chew.
Figure 13:
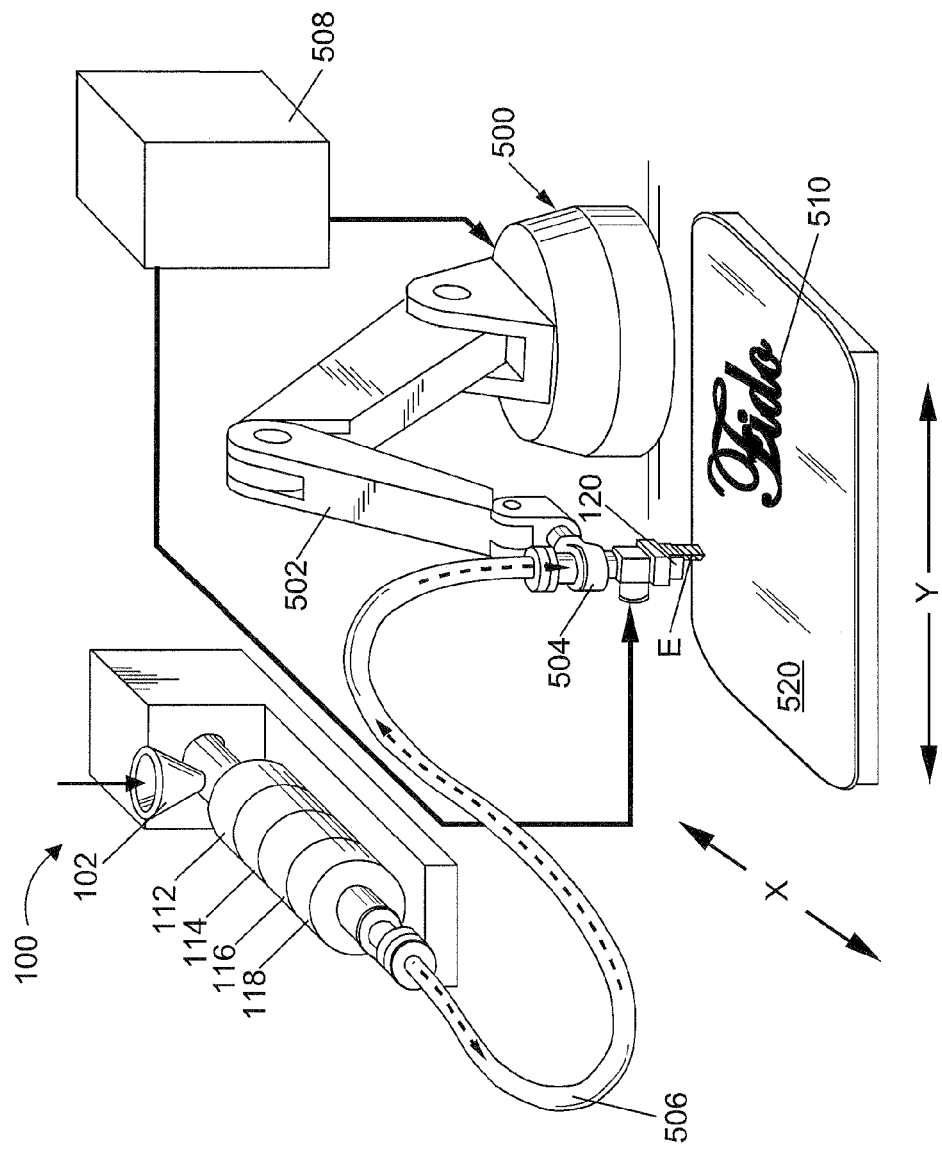
FIG. 13 is a schematic view of a robotic workstation including an extruder, according to the present disclosure.

In another related embodiment, see FIG. 13A, the molding surface 520 may comprise a first mold cavity 530 into which a log of extrudate of predetermined size and weight may be distributed by the robot 500. A matching second mold cavity (not shown) may then be positioned over the first cavity to form a closed cavity space for a shaped article, such as a dog chew.

Figure 14A:
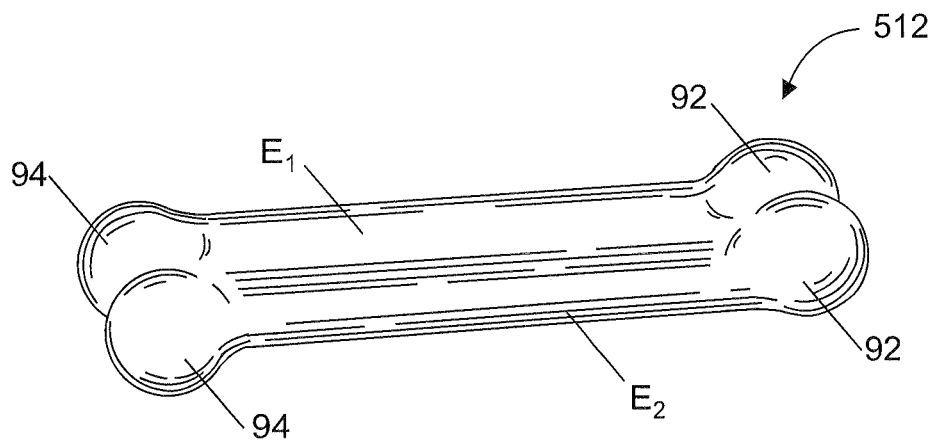
FIG. 14A is a perspective view of an exemplary dog chew, formed by the robotic workstation of FIG. 13.

In a still further related embodiment, the extrudate E from the robot head 504 (FIG. 13), may be delivered in a fashion to build shapes by the selective addition of successive passes by the robot head such that, for instance, a dog chew shape may be built up. As shown in FIG. 14A, two parallel passes of extrudate $E_1$ and $E_2$ may be laid on a molding surface 520 such that the passes are in contact along their length and when cooled adhere to one another to form dog chew 512. The ends 92 and 94 may be formed by pausing the lengthwise travel of the robot 500 temporarily to provide an accumulation of extrudate E, for instance at the ends of the chew.

Figure 14B:
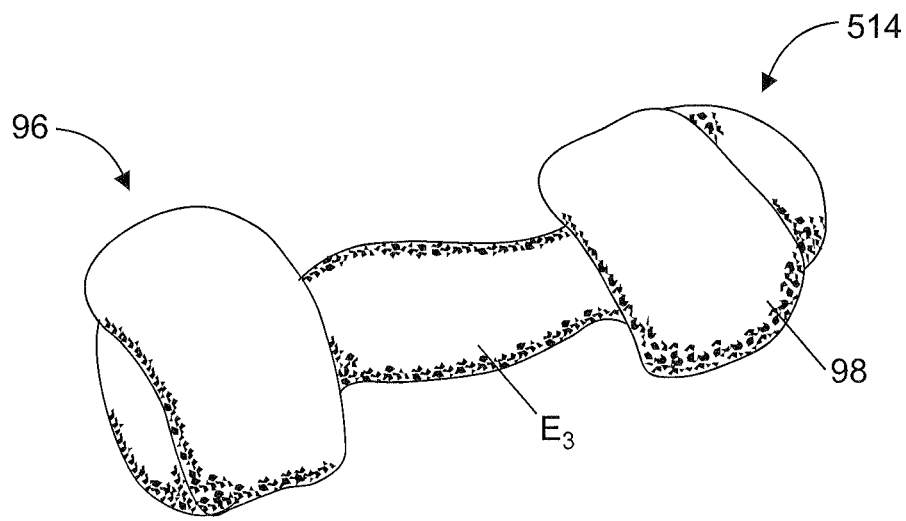
FIG. 14B is a perspective view of another exemplary dog chew, formed by the robotic workstation of FIG. 13.

FIG. 14B illustrates another shape for a dog chew 514 that may be formed by rotating the robot head 504 in a loop, followed by a relatively straight line of extrudate, followed by another loop to form a center portion E3 and two knuckle-like larger end portions 96 and 98.

It is further contemplated that the adjustable dies of FIGS. 4, 6, 7 and 8 may be combined into the robotic workstation of FIG. 13 or to produce the multiple streams of extrudate of FIG. 10 to produce non-uniform extrudates that may be combined together in a shaping die or may be delivered to a molding surface by a multi-axis robot. In that exemplary embodiment, the flexible coupling 506 may act as an accumulator to compensate for changes in throughput as the die orifice dimensions are adjusted and minimize any over shearing of the melt in the extruder barrel.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for forming chew toys of selected shape from edible compositions by extrusion, comprising the steps of:
   providing an extruder including a barrel and a die;
   providing an extrudable composition comprising an edible composition and water, the extrudable composition having a water content of between 10% to 40% by weight;
   introducing said composition to said barrel and subjecting said composition to shear and heat to form a melt;
   conveying said melt through said die to form an extrudate;
   passing said extrudate between cooperating surfaces, one of said surfaces having mold cavities, which mold cavities form the shape of said chew toy while said extrudate is at a temperature and moisture level that allow said extrudate to form within said mold cavities, wherein said mold cavities reside on a rotating surface and said other of said surfaces is a stationary surface; and
   forming said extrudate into the shape of a chew toy comprising a central shaft and a bone condyle at each end of said shaft, wherein a cross section of said central shaft varies over its length and said chew toy after forming has a water content of 10% by weight to 15% by weight.

2. The method of claim 1 wherein said water content of said extrudable composition is at a level of 10% by weight to 20% by weight.

3. The method of claim 1 wherein said water content of said chew toy is at a level of 10% by weight.

4. The method of claim 1 wherein said water content of said extrudable composition is at a level of 15% by weight to 20% by weight.

5. The method of claim 1 wherein said mold cavities reside in the outer periphery of an interacting wheel, wherein said wheel is rotated as said extrudate is passed between said surfaces.

6. The method of claim 1 wherein said mold cavities reside in the outer periphery of a belt, wherein said belt is moved as said extrudate is passed between said surface.

7. The method of claim 1 wherein said extrudate is severed into separate chew toys by said cooperating cavities.

\* \* \* \* \*